US011876479B2

(12) United States Patent
Phan

(10) Patent No.: US 11,876,479 B2
(45) Date of Patent: Jan. 16, 2024

(54) MOTOR HAVING INTEGRATED ACTUATOR WITH ABSOLUTE ENCODER AND METHODS OF USE

(71) Applicant: Cepheid, Sunnyvale, CA (US)

(72) Inventor: Tien Phan, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 0 days.

(21) Appl. No.: 17/162,605

(22) Filed: Jan. 29, 2021

(65) Prior Publication Data

US 2021/0257943 A1  Aug. 19, 2021

Related U.S. Application Data

(60) Provisional application No. 62/967,201, filed on Jan. 29, 2020.

(51) Int. Cl.
*H02P 7/025* (2016.01)
*H02K 1/27* (2022.01)
(Continued)

(52) U.S. Cl.
CPC ........... *H02P 7/025* (2016.02); *H02K 1/2791* (2022.01); *H02K 1/2795* (2022.01)

(58) Field of Classification Search
CPC ........ H02K 29/08; H02K 29/06; H02K 29/14; H02K 29/03; H02K 13/10; H02K 13/14;
(Continued)

(56) References Cited

U.S. PATENT DOCUMENTS 4,562,399 A * 12/1985 Fisher .................... H02K 29/06
310/156.43
5,408,153 A * 4/1995 Imai ....................... H02K 29/08
318/560
(Continued)

FOREIGN PATENT DOCUMENTS

CN         201860242 U      6/2011
EP           3306074 A2     4/2018
(Continued)

OTHER PUBLICATIONS

Machine Translation of WO 2017064767 A1 (Year: 2017).*
(Continued)

*Primary Examiner* — John K Kim
(74) *Attorney, Agent, or Firm* — Kilpatrick Townsend & Stockton LLP

(57) ABSTRACT

A DC electric motor having a stator mounted to a substrate, the stator having a coil assembly having a magnetic core, a rotor mounted to the stator with a first set of permanent magnets distributed radially about the rotor to facilitate rotation of the rotor and a second set of permanent magnets on the rotor to facilitate determination of an absolute position of the rotor. The motor further includes first and second set of sensors for detection of the magnets of the inner and outer rings. During operation of the motor passage of the permanent magnets over the sensors produces a substantially sinusoidal signal of varying voltage substantially without noise and/or saturation, allowing an absolute position of the rotor relative the substrate to be determined from the sinusoidal signals without requiring use of an encoder or position sensors and without requiring noise-reduction or filtering of the signal.

12 Claims, 10 Drawing Sheets

(51) Int. Cl.
*H02K 1/2795* (2022.01)
*H02K 1/2791* (2022.01)

(58) Field of Classification Search
CPC .... H02K 1/2791; H02K 29/12; H02K 1/2795; H02K 1/146; H02K 11/215; H02P 7/025; H02P 7/0094; H02P 7/03; H02P 7/05; H02P 7/29; H02P 7/2913; H02P 7/28; H02P 7/2805; H02P 7/206; H02P 21/06; H02P 21/10; H02P 6/16; H02P 7/02; G01D 5/145; G01D 5/245
USPC ........ 310/156.05, 156.06, 12.02, 68 B, 68 R
See application file for complete search history.

(56) References Cited

U.S. PATENT DOCUMENTS

| | | | |
|---|---|---|---|
| 6,218,748 B1 * | 4/2001 | Ushiyama | H02K 29/14 310/68 B |
| 6,522,130 B1 | 2/2003 | Lutz | |
| 7,075,290 B2 * | 7/2006 | Collier-Hallman | G01P 3/489 324/225 |
| 2003/0057781 A1 | 3/2003 | Shukuri | |
| 2006/0006747 A1 | 1/2006 | Kadowaki | |
| 2006/0016427 A1 | 1/2006 | Uda | |
| 2007/0176568 A1 | 8/2007 | Robichaux | |
| 2009/0292501 A1 | 11/2009 | Bernard | |
| 2009/0315493 A1 | 12/2009 | Hsu | |
| 2015/0295525 A1 | 10/2015 | Liu | |
| 2017/0025974 A1 * | 1/2017 | Phan | H02K 15/02 |
| 2017/0222582 A1 | 8/2017 | Suzuki | |
| 2019/0052214 A1 * | 2/2019 | Sumita | H02P 21/0021 |
| 2019/0229600 A1 * | 7/2019 | Woo | G01D 5/145 |
| 2021/0257943 A1 * | 8/2021 | Phan | H02P 6/16 |

FOREIGN PATENT DOCUMENTS

| | | | | |
|---|---|---|---|---|
| EP | 3780352 A1 | 2/2021 | | |
| JP | 04208090 A | 7/1992 | | |
| JP | 2015114209 A | 6/2015 | | |
| WO | WO-2007075041 A1 * | 7/2007 | | H02P 6/08 |
| WO | WO-2016140032 A1 * | 9/2016 | | |
| WO | WO-2017064767 A1 * | 4/2017 | | H02K 1/27 |
| WO | 2019/199056 A1 | 10/2019 | | |

OTHER PUBLICATIONS

Machine Translation of WO 2016140032 A1 (Year: 2016).*
International Search Report in PCT/US2021/015877, dated Apr. 26, 2021, 5 pages.

* cited by examiner

Red = Hall Effect Sensor A
Blue = Hall Effect Sensor B
Green = Hall Effect Sensor C Red = Hall Effect Sensor A
Blue = Hall Effect Sensor B
Green = Hall Effect Sensor C

MOTOR HAVING INTEGRATED ACTUATOR WITH ABSOLUTE ENCODER AND METHODS OF USE

This application claims the benefit of priority of U.S. Provisional Application No. 62/967,201 entitled "MOTOR HAVING INTEGRATED ACTUATOR WITH ABSOLUTE ENCODER" filed on Jan. 29, 2020, the entire contents of which are incorporated herein by reference.

This application is generally related to U.S. patent application Ser. No. 15/217,893 entitled "Encoderless Motor with Improved Granularity and Methods of Use" filed Jul. 22, 2016; U.S. application Ser. No. 15/217,893 entitled "Molecular Diagnostic Assay System" filed Jul. 22, 2016; U.S. patent application Ser. No. 13/843,739 entitled "Honeycomb tube," filed on Mar. 15, 2013; U.S. Pat. No. 8,048,386 entitled "Fluid Processing and Control," filed Feb. 25, 2002; U.S. Pat. No. 6,374,684 entitled "Fluid Control and Processing System," filed Aug. 25, 2000; and U.S. Provisional Application No. 63/136,766 entitled "Encoderless Motor With Improved Quantization and Methods of Use and Calibration," filed Jan. 13, 2021; each of which is incorporated herein by reference in its entirety for all purposes.

FIELD OF THE INVENTION

The present invention relates to the field of motion control and electric motors, in particular brushless DC electric motors, and pertains to commutation and encoding for such motors.

BACKGROUND OF THE INVENTION

Commutation for brushless DC (BLDC) electric motors typically employ Hall-effect sensors to sense movement of permanent magnets in operation of the motors. Hall-effect sensors, however, have not been successfully incorporated to encode DC motors to a high degree of accuracy and granularity without the use of additional position sensors and/or encoder hardware, and as such their usefulness in this context is limited. In many instances, the successful operations and application, of motor-driven elements requires a high degree of precision and resolution in determining the position (and changes in position) of the motor-driven elements. This is particularly important for small scale devices, for example, driving pumps and syringes to manipulate fluid samples in analytic processes in diagnostic systems. Another difficulty is precision-controlled motion of such motors. Motion control of brushless DC motors is well-known in the art by incorporation of a hardware encoder for position feed-back and speed control. However, when implementing motion control by conventional means, such as an electronic, motor, and/or optical encoder, the mechanical packaging of such motors becomes large, more complex and expensive.

There is a need, therefore, for systems and methods that allow for determination of displacement of a motor, for example, encoding of a BLDC motor, to a very high degree of resolution and positional accuracy. It is further desirable to provide motion control for such motors without use of an additional hardware encoder and with relatively simple hardware and control software.

BRIEF SUMMARY OF THE INVENTION

In one aspect, the invention herein pertains to the field of BLDC motors and motion control, in particular, an absolute encoder integrated within the motor in a small package. In some embodiments, the invention pertains to integrated motion which combines the motor with an integrated absolute encoder and controller functions in a relatively small package. This approach enables a new generation of robotic, human augmentation, automation equipment, military, and space flight uses because of its compactness, performance, light weight, and competitive price.

In some embodiments, this approach is embodied by a BLDC motor that is modified to include a rotor having a first inner magnetic ring, and a second outer magnetic ring and an additional sensors (e.g., analog Hall-effect sensors), thereby generating a second high-resolution encoder. A first encoder is generated by the "inner ring" of magnets which also serve the dual purpose for motor driving. The second encoder is generated by the second ring of magnets on the "outer ring" which are for encoder use only. In one aspect, the due to the manner in which the signals are processed, the encoder is absolute within one period, or electrical cycle. This enables instant-on from a positioning and commutation standpoint. Thus, the position of the motor can be determined with minimal rotor movement, in contrast to a motor with an incremental encoder. Similarly the second encoder is also absolute but over a different period. By using the "Vernier" relationship between the two absolute encoders—each absolute over a segment of the rotor displacement, an absolute displacement within a single rotor rotation can be derived.

In some embodiments, the motor system utilizes this approach to generate a high-resolution ABSOLUTE encoder that allows for determination of an absolute position of the rotor by utilizing geometric and algebraic interpolation between the sensor signals received by one or more sensors detecting passage of the magnets of the inner and outer magnet rings upon rotation of the rotor. In one aspect, the motor system analyzes only the linear portions of the sensor signals from the inner and outer magnet rings. While these concepts are described in regard to a motor having a rotatably-mounted rotor, it is appreciated that these concepts may also be applied to a linear motor having a linear stage that moves in a linear fashion.

In some embodiments, the BLDC motor utilizes a common microcontroller with integrated Analog-to-Digital Converter (ADC) to drive a three-phase half bridge to perform motor commutation. The controller can drive the motor via sinusoidal, trapezoidal, sync, or any other form of commutation and motor drive for the N number of motor phases.

In some embodiments, the BLDC motor utilizes the same microcontroller, or an additional microcontroller integrated into the motor, to interpolate the high-resolution incremental or absolute encoder and perform commutation and motor drive. In some embodiments, the controller can further provide any of: communication with a host system; PID feedback control; state-space feedback and feedforward control; and execution of motion trajectories. In some embodiments, the host communicates to the motor to move according to a predefined trajectory, for example, a predefined "curve" with constant acceleration, constant velocity and constant acceleration, or some other movement. Here the term trajectory will be taken to mean a time sequence of points on a path.

In one aspect, the motor can include a communication unit that provides wireless communication with this integrated solution over a wireless interface, for example, such as Bluetooth, BLE, Wi-Fi, 2.4 or 900 ISM bands, Zigbee, or any suitable communication means.

In another aspect, the motor can be configured with a power-line communication unit that is configured for communication with the integrated solution on a signal over power communications scheme. In some embodiments, select wires (e.g. two or more) connect to the motor which are used to power the motor drive bridge as well as motion control electronics. A voltage regulator can be used to take the higher voltage used for the motor drive and adjust this voltage for use with the processing electronics. In some embodiments, a specially designed circuit is used to modulate a signal onto the powerline, and demodulate a signal from the powerline, by the host controller. In some embodiments, two-way communication is achieved over the powerline from host controller and motor controller. It is appreciated that each of the above features can be used in an embodiment in combination with one or more other features.

Any of the aspects or features described above can be utilized with systems having multiple motors connected to a single powerline system, for example, by use of a single master host controller controlling all motors. Some such embodiments can utilize wireless communications where an additional "sync" line is used to ensure, synchronized ("lock step") motion of all motors in the system.

Some embodiments can utilize a controller that synchronizes multiple integrated motor, encoder, control and drive solutions to work in tandem with each other through a digital communications interface, for example, as Ethernet, EtherCAT (Ethernet for Control Automation Technology), SPI, i2c, UAR, RS232, RS485, or any other suitable fieldbus or digital communications interface. In some embodiments with multiple motor units, the controller can be configured for synchronization of multiple integrated motor units (with encoder and control and drive).

In another aspect, the motor includes a high-resolution linear motor encoder using two or more analog hall-effect sensors and a "standard" linear actuator magnetic array. In some embodiments, the motor uses the same magnets as already exist for motor drive of the linear motor. In some embodiments, a silicon device with integrated ADC and controller is used to perform the measurement, calculation and communication to a host system.

In yet another aspect, the invention pertains to a linear motor that includes any of the features described above alone or in combination. In still another aspect, the invention pertains to a combination of a rotary and linear motor that includes any of the features described above alone or in combination. In some embodiments, such motors having a combination of rotary and linear motors are all controlled by a single controller chip.

In some embodiments, a processing module is configured to process the signals from at least two sensors by utilizing a matrix transformation from which the motor displacement (e.g. angular displacement of rotor) is determined. Advantageously, utilizing matrix transformation from the signals of at least two sensors eliminates the velocity ripple arising from decoding methods that employ mathematical approximations. The velocity ripple can adversely affect the accuracy of a signal from an individual sensor and introduce vibration and instability in the drive train. The use of a mathematical transformation when decoding purely sinusoidal or other deterministic, periodic signal models provide increased resolution and fidelity for determination of motor displacement. In some embodiments, the encoder includes a processor communicatively coupled to the n magnetic field sensors and configured to determine displacement of the movable element based on n signals from the n magnetic field sensors by processing the n signals utilizing a transformation matrix.

In still another aspect, the encoder approach can be modified for a multi-speed mechatronic system. Such an encoder system can include: a movable element that applies at least two of a spatially-varying field, a first applying a field of period, S1 and a second, S2 where S2 is an integer multiple of the period, S1; and a stationary support having n1 sensors arranged within the period S1 and n2 sensors arranged within the period S2, where n1 and n2 are each greater than or equal to two, the sensors being configured to measure the magnetic field of the movable element. The system can further includes a processor that obtains the signals from the sensors and applies a transformation matrix to determine field angles, $\phi 1$ and $\phi 2$. In some embodiments, the processor is configured to: process n1 and n2 sensor signals from the n1 and n2 sensors; apply a mathematical transformation to compute sine and cosine of the field angles, $\phi 1$ and $\phi 2$, respectively; and compute $\phi 2$ with substantially equivalent resolution to $\phi 1$. The above described approaches can be utilized with the absolute encoder configuration described previously.

In some embodiments of the multi-speed approach, each of S1 and S2 can be a rotary displacement while in other embodiments, each can be a linear displacement. The mathematical transformation can be configured such that calculation of each field angle, $\phi$, is independent of an amplitude and bias of the magnetic field sensors. The magnetic field sensors are uniformly distributed within each period, S1 and S2. In some embodiments, the system is configured such that the applied magnetic field is represented by a sum of first and at least one of higher-order harmonics. In some embodiments, the processor of the control unit can store a runout represented by a spatially-varying signal representing the difference between the true field angle and the sensed field angle for each of field angles S1 and S2 and utilizes the runout to compensate for the difference thereby removing any runout error.

The above described encoder can be utilized in a BLDC motor configured for operation of a mechatronic system within a diagnostic assay system. In some embodiments, the mechatronic system of the diagnostic assay system comprises any of: a syringe, valve, or door mechanism. the processor can be configured to process only the substantially linear portions of the signals or can process the entire signal.

DETAILED DESCRIPTION OF THE INVENTION

In the foregoing specification, the invention is described with reference to specific embodiments thereof, but those skilled in the art will recognize that the invention is not limited thereto. As used throughout, the term "about" can refer to the ±10% of the recited value. Various features and aspects of the above-described invention can be used individually or jointly. It is appreciated that any of the aspects or features of the embodiments described herein could be modified, combined or incorporated into any of the embodiments described herein, as well as in various other types and configurations. Further, the invention can be utilized in any number of environments and applications beyond those described herein without departing from the broader spirit and scope of the specification.

Figure 1A:
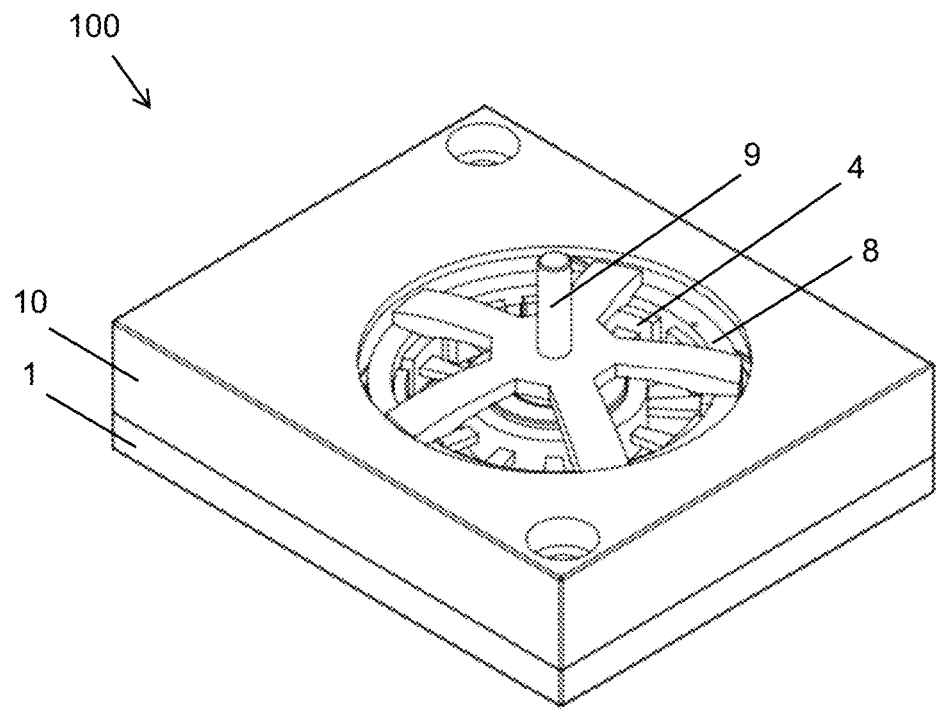
FIGS. 1A-1B show perspective view of a BLDC motor in an exemplary embodiment of the invention.
Figure 1B:
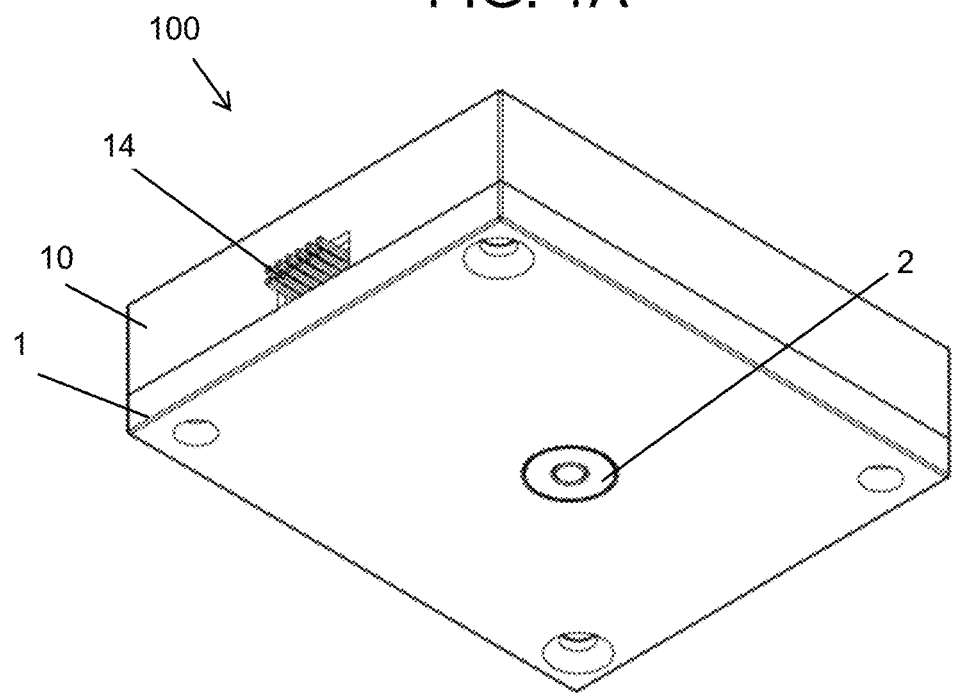
Figure 2A:
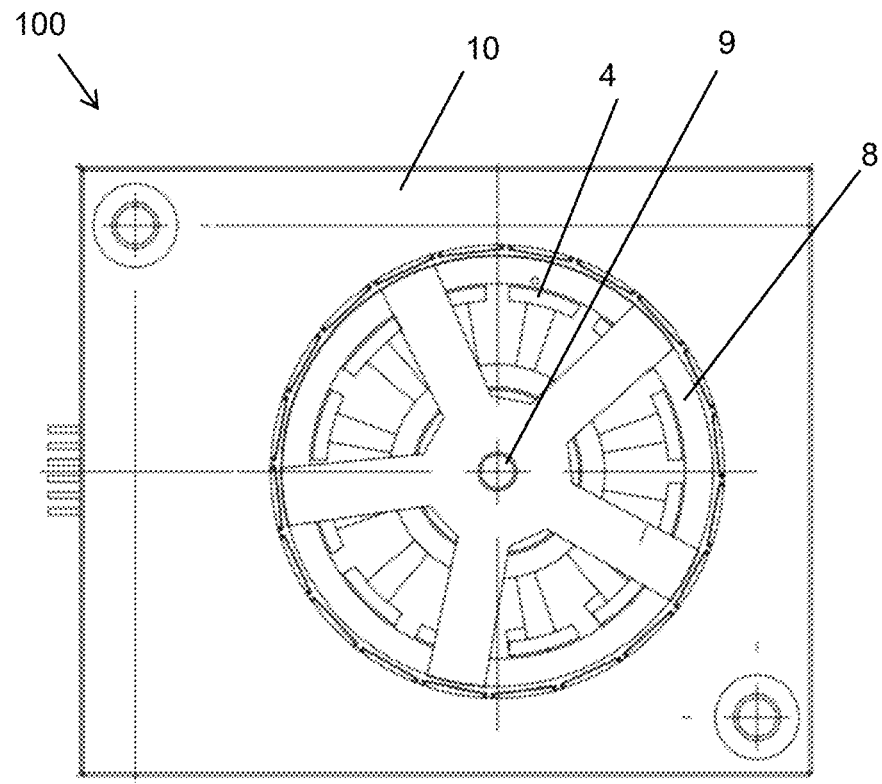
FIGS. 2A-2B show top and side views, respectively, of the BLDC motor of FIG. 1A.
Figure 2B:
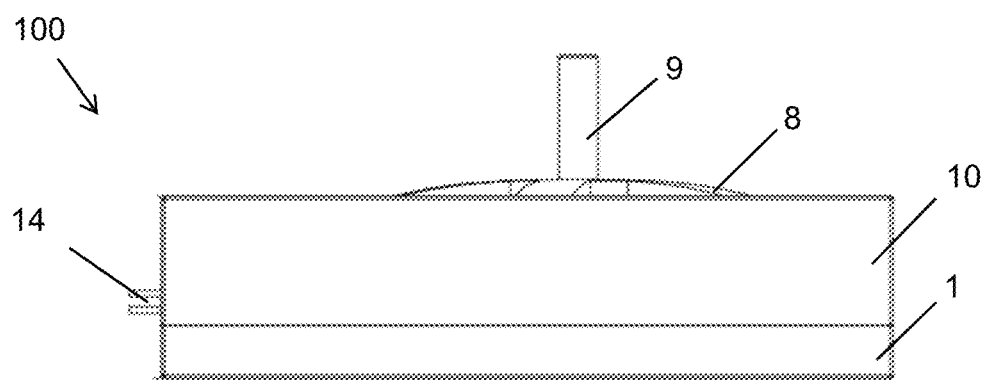
Figure 3:
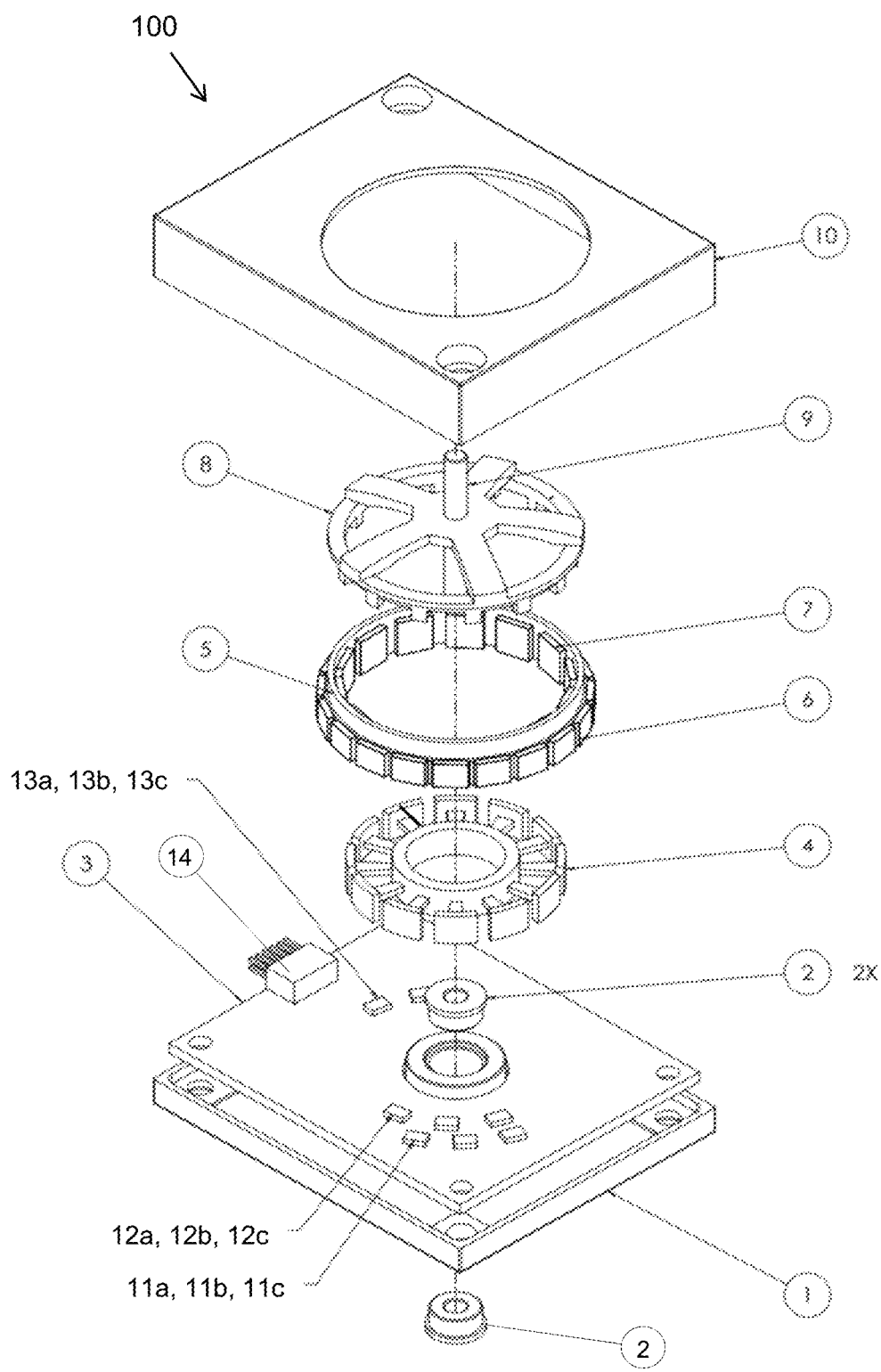
FIG. 3 shows an exploded view of the BLDC motor of FIG. 1A.

FIGS. 1A and 1B are perspective top and bottom views, respectively, of a brushless DC (BLDC) electric motor 100 having an integrated absolute encoder in accordance with some embodiments. FIGS. 2A and 2B shows top and elevational side views, respectively of the BLDC motor 100, and FIG. 3 shows an exploded view. As shown, the motor 100 includes: a block-shaped base 1, a bearing assembly 2 that rotatably supports the rotor assembly; a substrate 3, typically a printed circuit board (PCB); a stator 4 having multiple poles (each having pole teeth and a pole shoe); and an outer housing cover 10. The PCB substrate can include a controller and control circuitry for encoding and commutation. The rotor assembly includes a ring frame 5, outer magnets 6, inner magnets 7, and a rotor portion that includes a lid 8 and shaft 9. In this embodiment, the stator has 12 poles (each having pole teeth and pole shoes), while the rotor ring 5 has twenty outer magnets 6 and fourteen inner magnets 7.

Substrate 3 can include sets of sensors arranged for detection of the magnets of the inner and outer magnet rings during operation of the motor. In this embodiment, the PCBA substrate 3 include a series of three outer sensors 11a, 11b, 11c and a series of three inner sensors 12a, 12b, 12c distributed along a partial arc around the central opening through which the rotatable shaft 9 extends for detection of the inner and outer magnets, respectively. Additional outer sensors 13a, 13b, 13c (partly visible), can be included on the opposite side of the opening as well, although such sensors are optional. The optional additional sensors compensate the rotor runout, hysteresis, and the placement tolerance of the outer magnets which in turn enhance the position accuracy.

Rotor assembly engages physically with stator by drive shaft 9, which engages the bearing assembly 2 of the stator to guide rotation of the rotor with precision. Bearing 2 assembly includes two parts that rotatably engage the shaft from opposite sides of the PCB substrate. Details of the bearings are not shown, although it is appreciated that there are many conventional ways such bearings can be implemented. Drive shaft 9 passes through an opening in cover 10 and can be engaged to drive mechanical devices or torque transfer mechanism. The rotor rotates in either direction depending on details of commutation. It is appreciated that the approaches described herein can be used regardless of the direction of rotation of the rotor.

Individual components can be understood further by referring to FIG. 3, which shows an exploded view of the integrated actuator. In this embodiment, the design comprises a 20 W motor, a true 16+ bit absolute encoder, and the control electronic within a relatively small package. At top is the upper cover 10, in which an opening in the center of the cover allows the motor to couple with the interface equipment. In this embodiment, the central opening is relatively small (e.g. 10-50 mm, 20-40 mm, 35 mm). The rotor shaft 9 extends upward through the central opening for interfacing with equipment (the OD and shaft length can vary as needed). Rotor lid 8 includes a precise spacer for alignment with magnets of the inner and/or outer rings.

Ring 5 is calculated to an appropriate thickness to accommodate the flux density of the inner and outer magnets. As shown, the inner and outer magnets are mounted on the ring 5. It is appreciated however, that the inner and outer magnets can be included on separate rings that interface, or can be integral with one or more rings. In some embodiments, the outer magnet ring 6 and inner magnet ring 7 each includes magnets of any even number. In some embodiments, the number of magnets in inner magnet ring 7 is different from that of the outer magnet ring. In this embodiment, the outer magnet ring has twenty magnets, while the inner magnet ring has fourteen magnets. The combination of the outer magnet and inner magnet is central to generating an absolute encoder as described herein.

Also shown is stator core 4. In some embodiments, the stack length (e.g., height of the stator) of the stator including the winding is smaller or equal to the length of the magnets of the inner ring 6. This dimension allows for generating a noise free sine wave. In some embodiments, the sensors are separated from the magnets by a small distance. In small-scale devices, this separation is typically less than 5 mm, such as 4 mm, 3 mm, 2 mm or 1 mm or less depending on the overall size of the device and the strength of the magnetic fields. It is advantageous for the space between the sensors and the permanent magnets to be minimized in order to substantially eliminate noise in the detection signal. It is appreciated that any of the aspects described in U.S. patent application Ser. No. 15/217,893 entitled "Encoderless Motor with Improved Granularity and Methods of Use," for example, in regard to arrangement and dimensioning of magnets relative the rotor or magnetic core, can be utilized for either inner or outer magnet rings to provide noise free signals.

One or more sensors are disposed adjacent the path of the magnets during operation of the rotor. The rotor includes one or more inner sensor rings to detect a signal from the inner magnets and one or more outer sensors to detect the signal from the outer magnets. Typically, the rotor includes sets of multiple sensors disposed along the paths of the inner and outer rings, which are spaced apart and can be offset to provide improved resolution. In some embodiments, spacing within the sensors is calculated as follows:

$$S = 120/P$$

where:
S: Spacing between hall sensors, in degree.
P: Pole pair

In one aspect, the inner sensor(s) is the coarse encoder signal and also serves as the motor commutation, while the outer sensor(s) is the fine encoder signal which incorporates with the coarse signal to allow determination of an absolute position. This embodiment includes two sets of three sensors each. The two sets are placed 90° electrical and 180° mechanical apart to improve the resolution and position accuracy. It is appreciated that additional sensors or sensor arrangements could be used.

The above-noted sensors are typically mounted on the PCB substrate 3 for detection of the magnets, but can be placed on any suitable surface. The PCB also implements a silicon device with integrated ADC and microcontroller, which can be used to perform the motion control, measurement, calculation and communication to a host system.

In accordance with the applications noted above, it is noted that the absolute encoder features described herein allows the entire motor to be of a considerably small size. For example, the embodiment described herein can be of a dimension of about less than 4" square (length and width, as shown in FIG. 2A) and less than 2" in height (as shown in FIG. 2B). In some embodiments, this design allows for the motor with integrated actuator to be less than 2" square (length and width) and 2" or less in height. It is appreciated that the concepts described herein are not limited to these particular dimensions or small-scale mechanisms and could be used in various other motor designs of any size for various applications.

Figure 4:
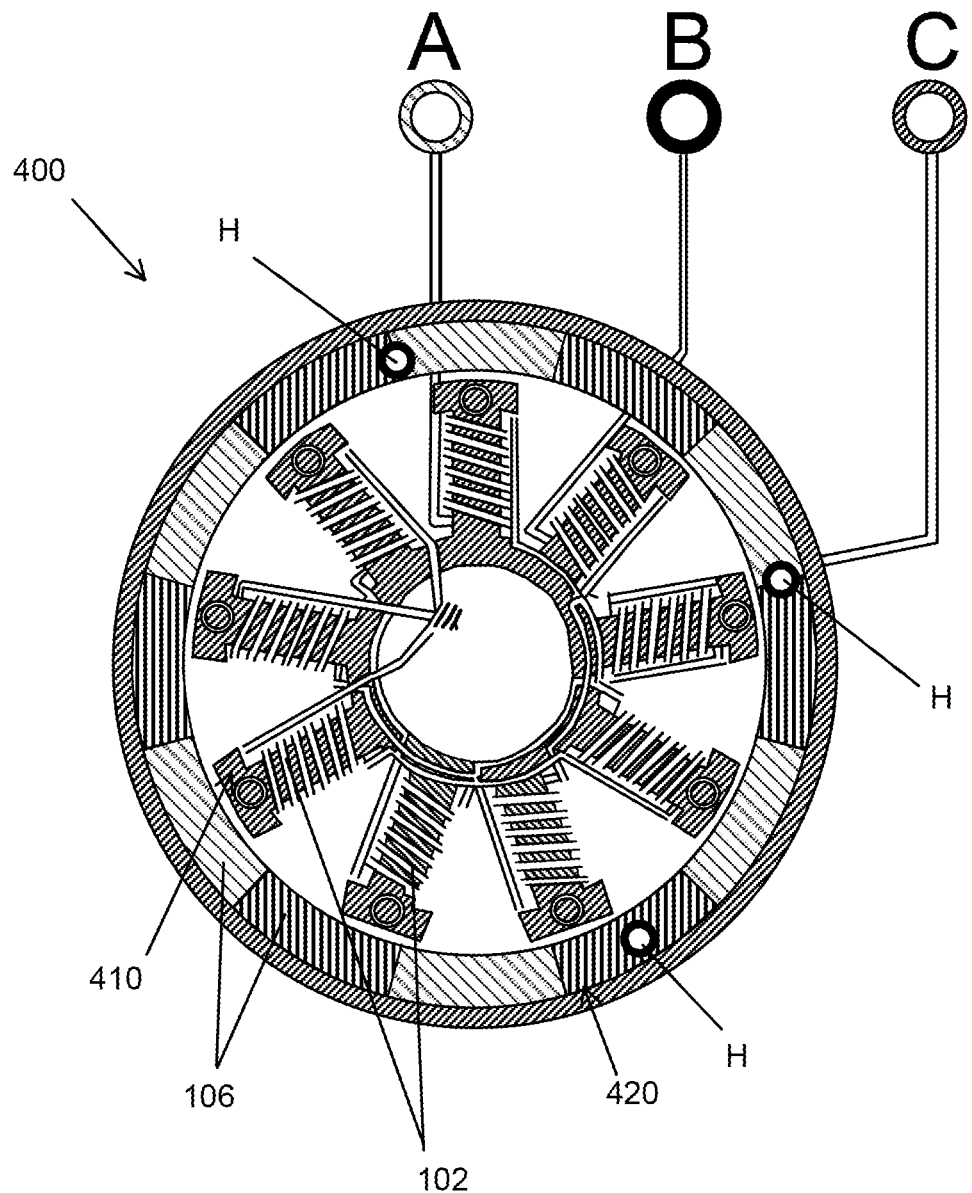
FIG. 4 shows a top schematic view of an BLDC motor with encoder in accordance with some embodiments.

In another aspect, a control unit (not shown in FIG. 1A) can switch current in the coils 102 providing electromagnetic interaction with permanent magnets 106 to drive the rotor, as would be known to one of skill in the art of BLDC motors, as shown in FIG. 4. The control unit can be connected via connector 14, such as the 12-pin connector shown in FIG. 2A-2B. The connector can provide means for communication as well as for powering the motor, as described previously. It is appreciated that the control unit can be separately provided or integrated within the PCB of the motor.

It is appreciated that this embodiment is a non-limiting exemplary prototype. It should be noted that the number of pole teeth and poles, and indeed the disclosure of an internal stator and an external rotor are exemplary, and not limiting in the invention, which is operable with motors of a variety of different designs. For example, while an internal stator and external rotor are described here, it is appreciated that this approach can also be used in a motor having an internal rotor and external stator as well.

Such a motor could be used in a wide variety of applications, and is of particular use for operation of a small-scale mechanical mechanism requiring a high level of accuracy and granularity. Some embodiments include a motor system having improved resolution in the determination of rotor position and/or displacement without use of hardware encoders and/or noise-filtering, for example, a resolution of about 0.1 degrees of mechanical rotation, or preferably about 0.01 degrees mechanical rotation, or even about 0.001 degrees of mechanical rotation or less. One such application is operation of a syringe drive to effect highly precise fluid metering, or operation of a valve assembly of a diagnostic assay system that interfaces with a sample cartridge in order to facilitate a complex sample processing and/or analysis procedure upon fine-tuned movement of the valve assembly. Examples of such applications can be found in U.S. patent application Ser. No. 15/217,893 entitled "Molecular Diagnostic Assay System"; U.S. Pat. No. 8,048,386 entitled "Fluid Processing and Control;" and U.S. Pat. No. 6,374,684 entitled "Fluid Control and Processing System," which are incorporated herein by reference.

FIG. 4 shows an exemplary motor 400 having a rotor and stator design and PCB layout that indicates the positions of three sensors, H (e.g. Hall-effect sensors). In accordance with a typical BLDC motor, the motor 400 includes a stator 410 with anchored windings on ferrous cogs, while the rotor 420 includes a rotating shroud with permanent magnets. In this embodiment, the sensors are spaced at 0, 120 and 240 "electrical degrees" where 360 electrical degrees is equal to the angle of one pole pair.

For a motor with 12 poles, for example, the Hall-effect Sensors are spaced at:

$A$ (degrees)

$A+20+(N*60)$ (degrees)

$A+40+(M*60)$ (degrees)

where:
A is an arbitrary position about the circumference of the magnetic rotor
N is some number of "electrical cycles" to offset the Hall-effect sensor
M is a second number of electrical cycles to offset the Hall-effect sensor In some embodiments, for a motor rotor with any number of poles, it is advantageous if the three sensors (e.g. Hall-effect sensors) are placed as follows about the circumference of the rotor magnets:

$A$ (degrees)

$A+120/P+(N*180/P)$ (degrees)

$A+240/P+(M*180/P)$ (degrees)

where P is the number of Poles in the Rotor

In some embodiments, for a motor rotor with any number of poles and any number of sensors (e.g. Hall-effect Sensors), the sensors are placed as follows (angles in degrees):

$$\sum_{H}^{N=1} A + \left\{ 360 * \frac{N}{P*H} \right\} + \left\{ X * \frac{180}{P} \right\}$$

where:
N is number of iteration
H is number of Hall-effect Sensors
A is some starting angle (degrees)
P is the number of total magnetic poles (pole pairs/2)
X is an arbitrary value to allow the Hall-effect sensors to be spaced (this could be equal to N, but could be larger if required for very large Hall-effect sensors or very many poles. If the Hall-effect sensors are sufficiently small and the poles sufficiently large, then X could be zero. X=N in the exemplary case).

In one aspect, an added benefit of using the same number of sensors on the inner ring and outer ring is that a commutation cycle will match the electrical cycle of the Hall-effect sensors. For example, as the rotor moves, the electrical angle at which one drives the motor windings cycles at the same rate as the Hall-effect sensors. This reduces processing power needed for the purpose of commutation as described further below.

Orientation of Hall-Effect Sensors

Figure 5A:
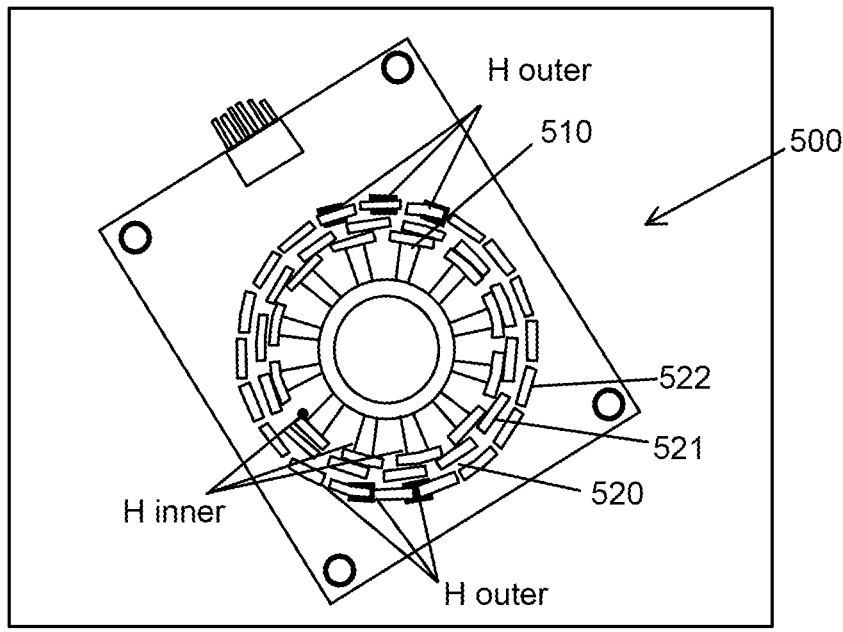
FIGS. 5A-5B show top schematic views of an BLDC motor with encoder in accordance with some embodiments.
Figure 5B:
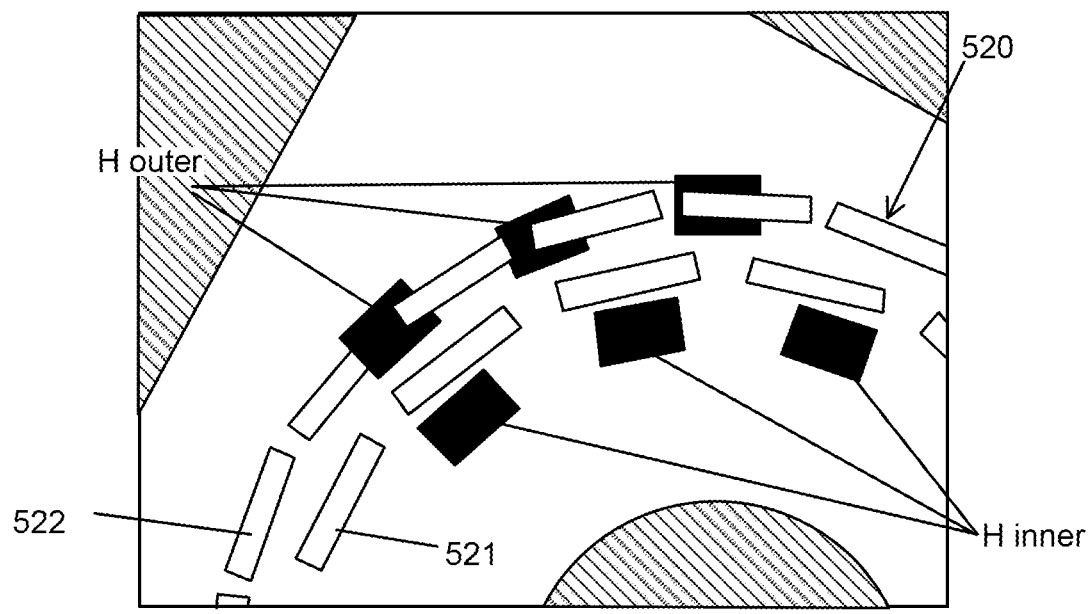
Figure 6:
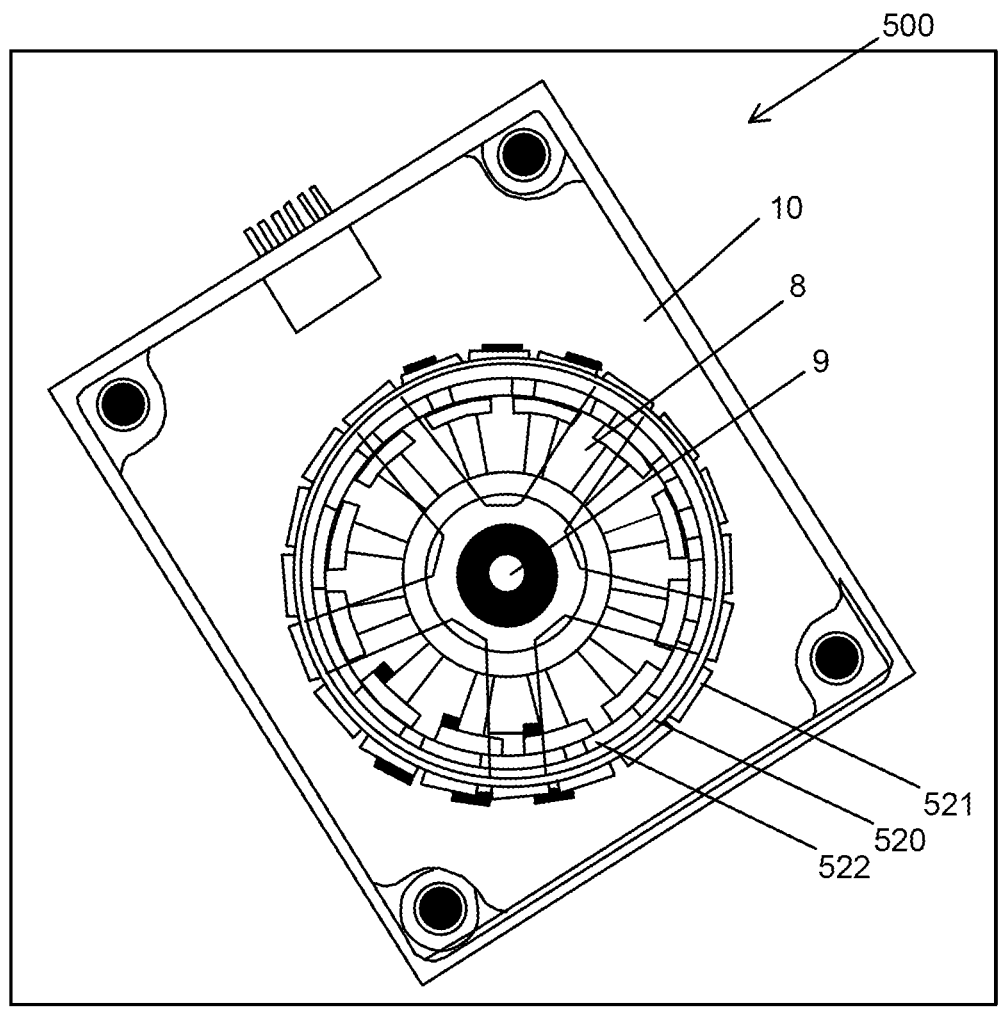
FIG. 6 shows top schematic views of an BLDC motor with encoder in accordance with some embodiments.

In another aspect, it is advantageous to orient the sensors (e.g. Hall-effect sensors) relative the rotor so that the locations of adjacent sensors corresponds to adjacent magnets, as shown in FIGS. 5A-6.

FIG. 5A shows another exemplary BLDC motor 500 which shows the position of the sensors, H, relative the magnets of the rotor (note the position of sensors H and magnets on the inner ring 521). FIG. 5B shows a detail view with the stator removed to better illustrate the relative positions of the magnets and sensors H. In accordance with a typical BLDC motor, the motor 500 includes a stator 510 with anchored windings on ferrous cogs, while the rotor 520 includes a ring 520 having an inner magnet ring 521 with permanent magnets as well as the outer magnet ring 522 with permanent magnets. In this embodiment, there are a series of inner sensors H inner disposed along or adjacent the path of the inner magnets and there are a series of outer sensors, H outer, disposed along or adjacent the path of the outer magnets. FIG. 6 shows substantially the same exemplary motor as FIG. 5 with the housing cover 10 and rotor lid 8 and shaft 9 shown as transparent.

In one aspect, commutation of the BLDC motor 500 can be performed using only three sensors. The specific embodiment described here is for a three-phase, fourteen-pole, brushless, direct-current, motor. It is appreciated that the concepts of the invention described herein are not limited to this specific embodiment. This same approach can be utilized for encoder interpolation and commutation of many different kinds of motors as well as many different motor poles. In some embodiments, the magnets used for encoding/position detection can be the same magnets that are used for motor drive, which reduces total number of magnets needed in the system thereby allowing for additional integration.

Hall-Effect Waveforms

Figure 7:
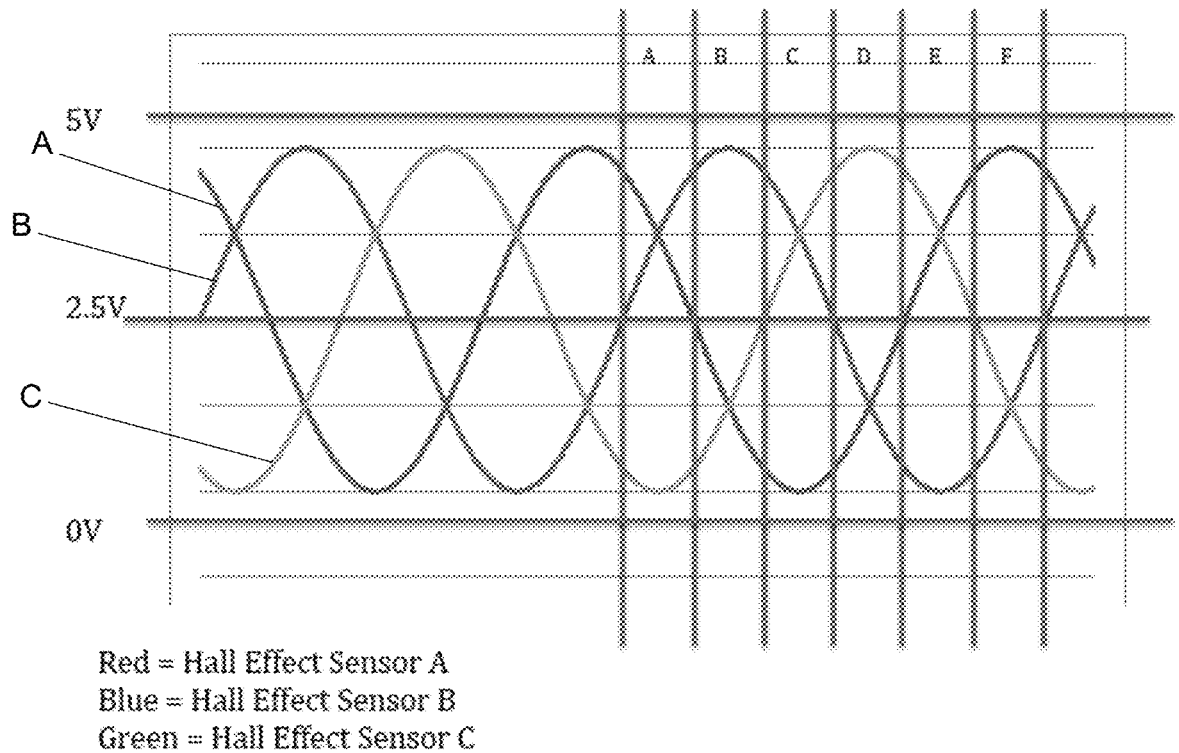
FIGS. 7-8 shows waveforms of the voltage signals from sensors of an exemplary BLDC motor with encoder in accordance with some embodiments.
Figure 8:
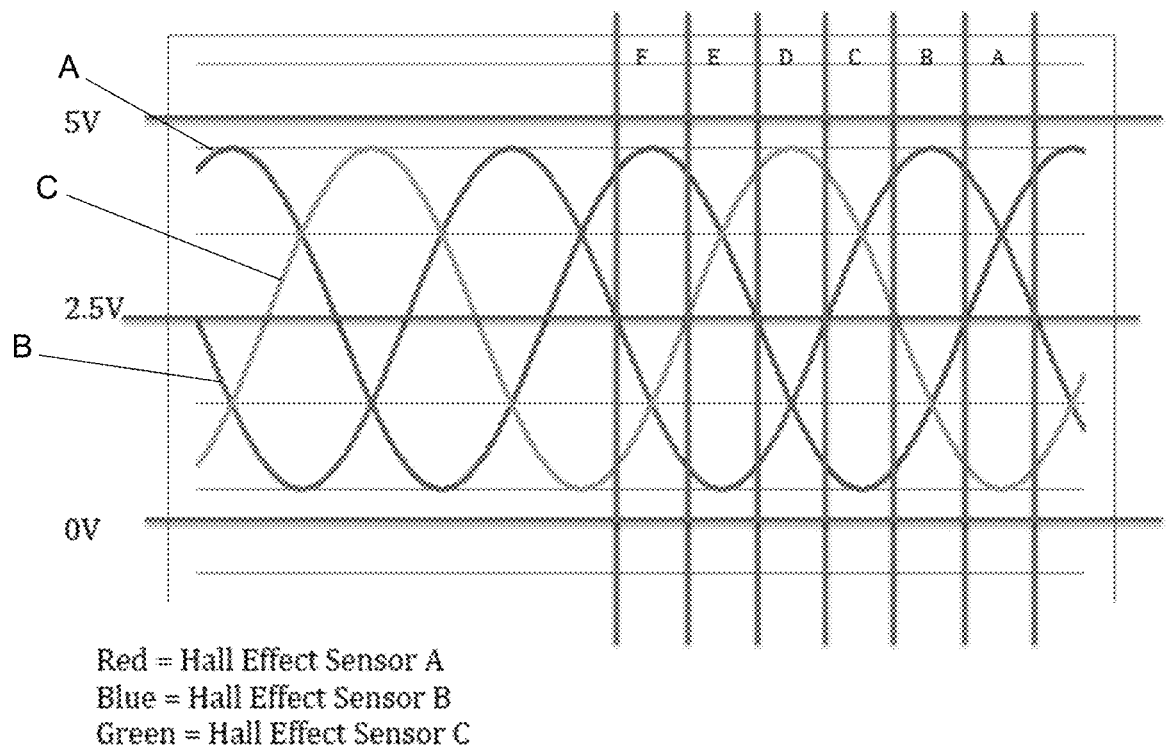

FIGS. 7-8 shown below displays the analog voltage signal waveforms output from a logical set of properly biased analog Hall-effect sensors, properly spaced such that the permanent magnets in the motor produce waveforms separate by 60°. FIG. 7 depicts a rotor moving clockwise, while FIG. 8 shows counter clockwise motion.

In this embodiment, for analog Hall-effect sensors that are powered off of 5 V, zero crossing (where the Hall-effect sensor is not experiencing a magnetic induced Hall-effect) is very close to 2.5V, which is typical for most Hall-effect sensors. Zero crossings can be utilized to divide up the sampled Hall-effect sensor data. In one aspect, additional algorithms can be used to interpolate rotor position with even finer granularity than zero-crossing, for example, a "Center of mass" or "Centroid" algorithm.

In one aspect, the control unit can utilize operating instructions recorded on a readable memory thereof, which include such an algorithm. For example, in some embodiments, the control unit is configured to perform the centroid based interpolation, which can be firmware that is programmed into the ASIC in the exemplary motor system.) An example of such an algorithm is provided in the following code, which is written in ANSI C:

```
InterruptServiceRoutine(commutationHandler)
{
    commutationState = 0;
    if (ADC_SAR_Seq_finalArray[0] > 0)
        commutationState |= 0b001;
    if (ADC_SAR_Seq_finalArray[1] > 0)
        commutationState |= 0b010;
    if (ADC_SAR_Seq_finalArray[2] > 0)
        commutationState |= 0b100;
    switch(commutationState)
    {
        case 0b101:
            firstParam = 0;
            secondParam = 2;
            //signage = 0;
        adder = 2 << extraResolutionForEncoder;
            break;
        case 0b001:
            firstParam = 2;
            secondParam = 1;
            //signage = 1;
```

```
        adder = 3 << extraResolutionForEncoder;
            break;
        case 0b011:
            firstParam = 1;
            secondParam = 0;
            //signage = 0;
        adder = 4 << extraResolutionForEncoder;
            break;
        case 0b010:
            firstParam = 0;
            secondParam = 2;
            //signage = 1;
        adder = 5 << extraResolutionForEncoder;
            break;
        case 0b110:
            firstParam = 2;
            secondParam = 1;
            //signage = 0;
        adder = 6 << extraResolutionForEncoder;
            break;
        case 0b100:
            firstParam = 1;
            secondParam = 0;
            //signage = 1;
        adder = 7 << extraResolutionForEncoder;
            break;
        default:
            break;
    }
    temp = ADC_SAR_Seq_finalArray[firstParam] +
ADC_SAR_Seq_finalArray[secondParam] +
ADC_SAR_Seq_finalArray[secondParam];
    //assuming zero point of 0... May need to eventually calibrate..
        temp <<= extraResolutionForEncoder; //12 bits of centroid
algorithm
        temp /= ADC_SAR_Seq_finalArray[firstParam] +
ADC_SAR_Seq_finalArray[secondParam];
        temp -= (2^extraResolutionForEncoder); //remove offset
from centroid algorithm.
        // we get two clock pulses per ZC
        if (ADC_SAR_Seq_finalArray[firstParam] == 0)
    //if the first parameter is zero, then keep track of boundary
condition...
            temp -= 1;
        adder -= temp;
    //FW based quaderature decoder
        if ((adder < 768) && (commutationWheel_last > 2304))
    hwEncoder += 3072;
        else if ((adder > 2304) && (commutationWheel_last < 768))
    hwEncoder -= 3072;
        commutationWheel_last = adder;
        encoder = hwEncoder + adder-encoderOffset;
    //end FW based quad decoder
        adder /= 6;
        commutationWheel = adder;
```

It is appreciated that such algorithms could utilize the same or similar approach by use of any suitable programming languages.

The above routine is performed at a sampling rate of $1/\Delta t_s$. where $\Delta t_s$ is the time interval between samples in the discrete-time implementation. All three channels of Hall-effect sensor are sampled in this period. In an exemplary case, the three Hall-effect sensors are sampled at 100 ksps rate and are run through an analog mux. On-chip DMA resources can be used to transfer the samples from the ADC to the processor's SRAM memory, which end up in an array called: "ADC_SAR_Seq_final Array". In the exemplary case, the $\Delta t_s$ is programmable down to 100 µs. This function provides two different outputs. One output is a parameter called "Commutation Wheel". Commutation wheel is a 512 count (9 bit) representation of where the rotor is located within the A-F electrical commutation cycle. The other output is a parameter called "encoder". "Encoder" is a continuous encoder (64-bits in this case) which continues to increment with each electrical cycle. "Encoder" in this case has 3072 counts of resolution per electrical cycle and billions of counts of integrated resolution.

Simple Centroid Approach

In some embodiments, the control unit can be configured to utilize the "Simple Centroid" approach to interpolate the hardware encoders utilizing the analog levels of each AH waveform individually. For example, in Commutation state 100, note that waveforms B and C cross each other in a near-linear fashion within this commutation section. The following algorithm is used in this section to add additional encoder resolution to the hardware encoder already running. The hardware encoder already has six (6) counts of resolution per pole: any additional resolution (AR) may be used to augment this resolution with the "Simple Centroid" algorithm.

$$EP=((HE)*(AR)/2)+\{[(B*AR)+(C*AR*2)]/AR\}-AR$$

where:
EP=Encoder Position
HE=Hardware Encoder
AR=Additional Resolution
B=ADC of Analog B phase AH waveform
C=ADC of Analog C phase AH waveform Additional Functionality In addition to commutation and encoding, this specific embodiment performs closed loop PID control of rotor position, current measurement and command and control. In this embodiment, control can include a floating point rotation translation for a worm drive with 284 rotor revolutions per revolution over a UART interface.

Figure 9:
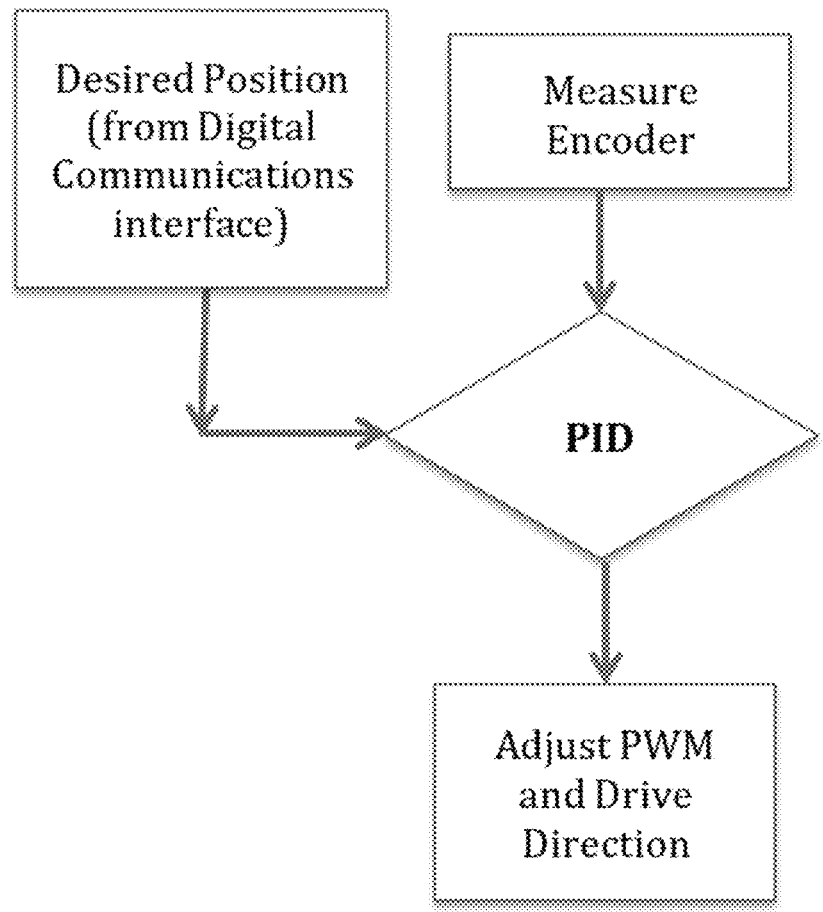
FIG. 9 shows closed loop control of a BLDC motor with encoder in accordance with some embodiments.

The hardware system described above allows the firmware to be somewhat isolated from the low-level motor driving functionality. It is appreciated that PID control can be used to control the motor, as would be readily understood by one of skill in the art. However, suffice it to say that the firmware may simply drive the direction and PWM of the instantiated hardware system. An example of such a PID control is shown in FIG. 9. Such a control method can include the following steps: 1. Measure the Encoder Position→2. Compare this to desired position→3. Input these desired and actual positions into the PID control system.→4. Adjust direction and PWM of motor control based upon output of PID control. In addition to the PID control, a Delta Sigma based (Low Pass Filtering) ADC can be utilized to measure current. This current may be requested over the UART interface and reported to the control unit.

"Outer Magnet Ring"

In order to include an absolute encoder in the design, a secondary "outer ring" can be utilized. In some embodiments, the outside ring of magnets utilizes Hall-effect sensors for measurement that are spaced with the same calculations as the inside ring described above.

The outer ring can utilize the same ADC techniques and algorithms to generate a "Commutation Wheel" and "Encoder" parameter for the outside ring. In some embodiments, the same mathematical approach that was used with the inner ring, described above, can be used with the outer ring.

The mechanical placement of the magnets on the rotor and the vertical relationship of the magnets to the Hall-effect sensors are precisely controlled. In this embodiment, the outer ring magnets are placed 20 mils closer to the Hall-effect sensors in the vertical direction.

The relationship between the number of poles in the inner and outer rings is another factor to consider. In one aspect, the number of pole pairs for the inner ring and the number of pole pairs for the outer ring must not share a common denominator. In one aspect of some embodiments, the magnets position on the inner ring and outer ring should not repeat over one revolution, which means the value of the outer pole pairs divided by the inner pole pairs is not a whole number. In the exemplary embodiment, the inner ring has seven pole pairs and the outer ring has ten pole pairs.

Absolute Encoder Calculations

Figure 10:
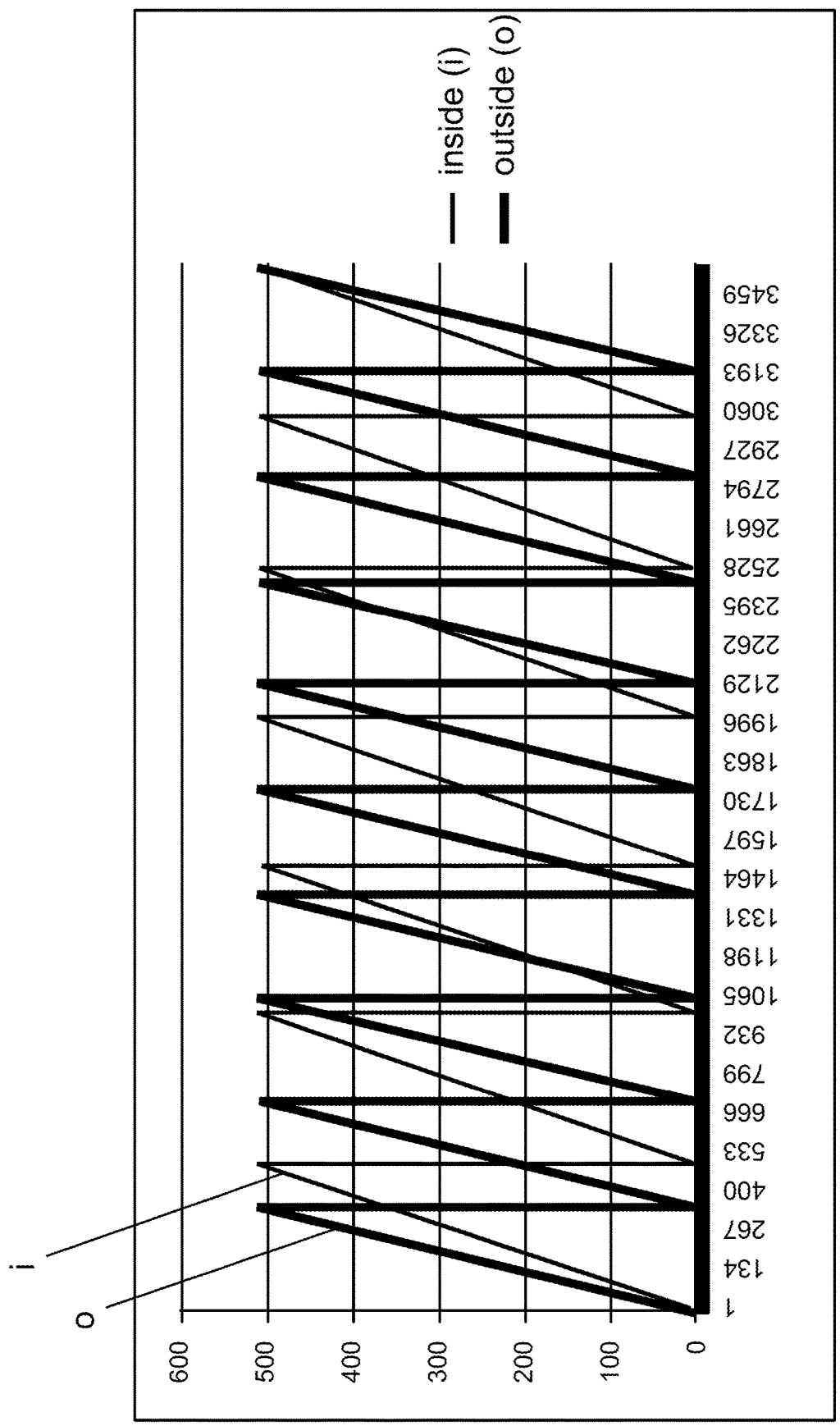
FIGS. 10-11 shows a relationship between the inner and outer rings of magnets of a BLDC motor with an integrated, absolute encoder in accordance with some embodiments.
Figure 11:
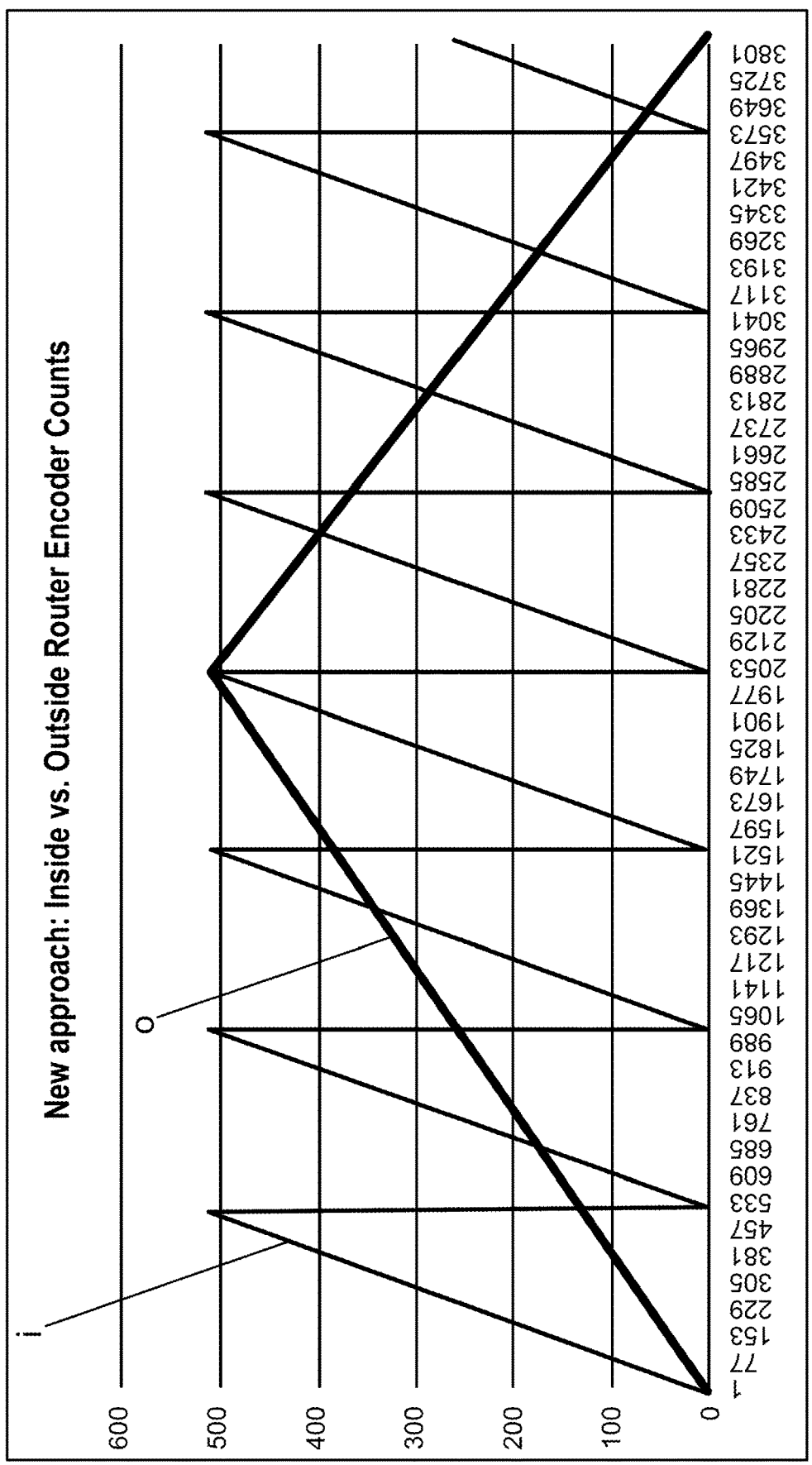

FIGS. 10-11 illustrate a relationship between the absolute position and the commutation of the outer and inner rings. The relationship between the absolute position and the "Commutation Wheel" of the inner ring and "Commutation Wheel" of the outer ring is utilized to determine which electrical cycle the motor is in of the "P/2" number of electrical cycles in a revolution. For example, in a motor with "P" poles, there are "P/2" electrical cycles such that there are seven electrical cycles on the inner ring and ten electrical cycles on the outer ring per revolution. As can be seen in the figure, by utilizing differing numbers of pole pairs defined by the magnet, the linear portions of the signals from the inner and outer magnet rings cross each other, thereby providing improved granularity. It is appreciated that the number of magnets and pole pairs of the outer ring can be greater than the inner ring (for example, 10-to-7 as shown in FIG. 10), or less than (for example, 2-to-7 as shown in FIG. 11).

The electrical cycle relationships for an entire revolution of two exemplary motor embodiments are illustrated in FIGS. 10 and 11. Notably, for every position in every electrical cycle, the relationship between the inside ring and outside ring will determine which electrical cycle within the entire revolution the rotor is positioned. The following algorithm can used to make this determination. (This utilizes 512 counts per electrical cycle. This number is not a required for proper operation, but is used because it is a convenient binary value for multiplication and division in two's compliment.)

For each value of the inner Commutation wheel there is an IPP number of outer commutation wheel values possible as shown here:

$$OW[N] = \sum_{IPP-1}^{N=0} \left[\frac{N*IW*R}{IPP}\right] \% \left[\frac{R}{OPP}\right]$$

where:
N=Number of iteration
IW="Commutation Wheel" Value corresponding to electrical position on inner ring
OW="Commutation Wheel" Value corresponding to electrical position on outer ring
IPP=number of inner ring pole pairs
OPP=number of outer ring pole pairs In one aspect, the inner and outer rings must NOT have a common denominator of pole pairs of each ring. If the inner and outer ring have a common denominator then the series OW[N] will have two or more values of equal magnitude. It will then be impossible to make the determination of location around the absolute rotation. Therefore, the set of all valid inner and outer ring pole pair combinations is the infinite set where IPP % OPP !=0

The above series could be calculated with each iteration of measurement given enough processing power. However, it is advantageous to accelerate this equation for the benefit of absolute encoder output. This is accomplished through the following ANSI C equation.

```
#define INNER_POLE_PAIRS 7
#define RESOLUTION_OF_COMM_WHEEL 512
int modulationValueTable[INNER_POLE_PAIRS+1]={
37,
110,
183,
256,
329,
402,
475,
549,
};
```
The values in the modulationValueTable table are given by:

$$modValueTable[N] = \sum_{IPP}^{N=0} round\left[\frac{R}{2*IPP} + \frac{N*R}{IPP}\right]$$

where:
IPP is the Pole Pairs in the inner ring.
R is the Resolution of the commutation wheels
N is the number of iteration

```
int modulationIndexTable[8]={
0, //
5, //
3, //
1, //
6, //
4, //
2, //
0, //
};
```
The values in the modulationIndexTable table are given by:

$$i[N] = \sum_{IPP}^{N=0}\left[\frac{R*OPP*i}{IPP}\%R\right] = \frac{R*N}{IPP}$$

where:
IPP is the Pole Pairs in the inner ring.
R is the Resolution of the commutation wheels
N is the number of iteration
i is the modulation index table value
int absBotTable[512]= . . .
The values in the absBotTable table are given by:

$$absBotTable[N] = \sum_{R-1}^{N=0} round\left[\left\{\frac{N*OPP}{R*IPP}\right\}\%R\right]$$

where:
IPP is the Pole Pairs in the inner ring.
OPP is the Pole Pairs in the outer ring.
R is the Resolution of the commutation wheels
N is the number of iteration

```
int32 absoluteEncoderFunction (void)
{
    int i;
    int32 temp;
    if (commutationWheelOutside < 0)
```
-continued
```
        commutationWheelOutside += 512;
    if (commutationWheelOutside >= 512)
        commutationWheelOutside -= 512;
    if (commutationWheelInside <0)
        commutationWheelInside += 512;
    if (commutationWheelInside >= 512)
        commutationWheelInside -= 512;
    temp = commutationWheelOutside -
    absBotTable[commutationWheelInside] ;
    while (temp < 0)
        temp += 512;
    for(i=0;i<8;i++)
    {
        if ( temp < modulationValueTable[i] )
        {
            temp = 12288;
            temp *= modulationIndexTable[i]+1;
            temp -= extremeAbsoluteResolution;
            return (temp) ;
        }
    }
    return (0xffffffff);
}
```

Where commutationWheelOutside and commutationWheelInside are the inside and outside commutation wheel parameters and "extremeAbsoluteResolution" is a higher resolution version of the inside commutation wheel (12288 counts to be exact) given by the same simple centroid algorithm as before. If the inside and outside rings are not perfectly aligned, then an alternate table can be utilized to compensate for the offset between rings. This can be performed by adding an offset which is proportional to the offset between inner and outer ring commutation wheels. The offset between outside and inside commutation wheel counts can be measured in outside commutation wheel counts. These counts can then be subtracted from the line above as shown:

. . .

temp=commutationWheelOutside−absBotTable[commutationWheelInside]−OFFSET; while(temp <0)

temp+=512;

. . .

As described above in the non-limiting exemplary embodiments, an ADC is used to produce the division of the straight, linear portions of the phase-separated waveforms and motor 100, which can be driven by any suitable driver circuitry (for example, a DRV83 13 Texas Instruments motor driver circuit). It is understood that there are other arrangements of circuitry that might be used while still falling within the scope of this approach. In some embodiments the circuitry and coded instructions for sensing the Hall-effect sensors and providing motor encoding may be implemented in a programmable system on a chip (PSOC) on the PCB.

The above-described approach is one way of determining the absolute encoder value by looking at the phase-shift in the substantially linear portions of the Hall-effect sine waves. However, it is appreciated that the matrix transformation approach can also be used. Using the matrix transformation method, the absolute position is calculated on each of the inner-ring and outer ring respectively and then an absolute position can be determined within one rotor revolution using the Vernier effect. This is the same concept as described above in that the phase-shift between the inner and outer ring provides an unambiguous way of determining the absolute position.

It is appreciated that a variety of alterations can be made in the embodiments described herein without departing from the scope of the invention. For example, electric motors of different designs might be incorporated and controlled in alternative embodiments of the invention by placement of sensors to generate substantially sinusoidal phase-separated waveforms in a manner that the circuitry takes into account only the substantially straight, linear portions of the resulting, intersecting curves, with additional resolution provided by dividing the straight portions into equal length segments, effectively dividing the voltage increments into equal known segments to be associated with fractions of rotor or stator rotation, depending on mechanical design of the motor.

Some non-limiting exemplary uses and applications for a DC electric motor according to the invention include the following:

Diagnostic applications: With increasing use of robotics for use in high-throughput processing of fluid samples and performing of diagnostic assays, high resolution control of mechanical mechanisms has become extremely useful. Particularly, as diagnostic devices have trended toward small-scale and microdevices, which are more efficient and require smaller sample sizes, control over small-scale movements is of particular interest.

Medical applications: With increasing use of robotics for remote surgery techniques, extremely well controlled movement of remotely controlled implements have become essential. For example, in ophthalmology or neurology procedures where manipulation of retinal cells or nerve endings require movements with microscopic resolution. In order to effect these movements, which are far finer than is possible with a human hand with eye coordination, computers are used to move actuators in concert with feedback from suitable sensors. A motor with high resolution positional encoding capabilities as disclosed herein can assist the computer, and therefore the surgeon, in performing these delicate procedures.

Semiconductor fabrication: Systems for fabrication of semiconductor devices rely on fine movement of the silicon wafer and manipulator arms. These movements are regulated by means of positional feedback. A motor with high resolution positional encoding capabilities as disclosed herein suitable in these applications.

Aerospace and satellite telemetry: High resolution angular position feedback can be used for precise targeting and for antenna positioning. In particular, satellite communication antenna dishes need to precisely track orbiting satellites. Satellite trajectory combined with precise angle feedback from a motor as described herein mounted to the antenna and power spectrum from the antenna can assist precise tracking. In addition, because the motor as described herein is small, inexpensive and robust, it is an ideal choice for use on satellites and in other extra-terrestrial applications that will be well known to persons of skill in the art.

Remote controlled vehicles: the small size and reduced cost of the motor disclosed herein makes it desirable for use in remote controlled vehicle applications, including drones. In particular the high resolution positional encoding features of the motor make it ideal for steering (directional control) and acceleration (power control) in both commercial and recreational uses of remote controlled vehicles. Additional uses will be apparent to persons of ordinary skill in the art.

Further to the above, the skilled person will be aware that there are a variety of ways that circuitry may be arranged to provide granular control for a motor thusly equipped and sensed. The invention is limited only by the claims that follow.

What is claimed is:

1. A method for encoding a DC electric motor, the method comprising:
    operating a motor by powering a coil assembly of a stator of the motor, the coil assembly having a core of magnetic material and electrical windings, thereby rotating a rotor having an inner magnet ring having a first set of permanent magnets adjacent to the core of magnetic material, wherein the rotor further includes an outer magnet ring having a second set of permanent magnets, and a common ring wherein the first set of permanent magnets are mounted on an inside surface of the common ring defining the inner magnet ring, and the second set of permanent magnets are mounted on an outside surface of the common ring defining the outer magnet ring; and
    determining an absolute position of the rotor by:
        obtaining, with one or more sensors of the motor, a first signal from the first set of permanent magnets passing by the one or more sensors during rotation of the rotor;
        obtaining, with one or more sensors of the motor, a second signal from the second set of permanent magnets passing by the one or more sensors during rotation of the rotor; and
        analyzing the first and second signals and correlating to a position of the rotor.

2. The method of claim 1, further comprising:
    adjusting operation of the motor based on the determined absolution position of the rotor.

3. The method of claim 2, wherein adjusting operation comprises adjusting a pulse-width-modulation and/or a drive direction of the motor.

4. The method of claim 1, wherein the motor is operated via a controller, the method further comprising:
    receiving, with the controller, a desired position of the rotor;
    comparing the desired position with the absolute position determined; and
    adjust pulse width modulation and drive direction based on comparison to achieve the desired position of the rotor.

5. The method of claim 4, wherein the controller is a proportional-integral-derivative (PID) controller.

6. The method of claim 1, wherein the stator is mounted on a substrate, and the one or more sensors are mounted on the substrate along a path of the magnets of the inner and outer magnet rings, respectively.

7. The method of claim 1, wherein the rotor comprises any of:
    a ring having magnetized poles therein that define the inner magnet ring, while the outer magnet ring is defined by the second set of permanent magnets mounted on the ring; and
    a ring having magnetized poles therein that define the outer magnet ring, while the inner magnet ring is defined by the first set of permanent magnets mounted on the ring.

8. The method of claim 1, wherein the inner and outer magnets each comprise an even number of magnets.

9. The method of claim 8, wherein the inner magnet ring comprises a different number of magnets than the outer magnet ring.

10. The method of claim 1, wherein each of the inner and outer magnet rings comprise a one or more pole pairs, wherein a number of pole pairs of the inner and outer rings do not share a common denominator.

11. A method for encoding a DC electric motor, the method comprising:
- operating a motor by powering a coil assembly of a stator of the motor, the coil assembly having a core of magnetic material and electrical windings, thereby rotating a rotor having an inner magnet ring having a first set of permanent magnets adjacent to the core of magnetic material, wherein the rotor further includes an outer magnet ring having a second set of permanent magnets; and
- determining an absolute position of the rotor by:
  - obtaining, with one or more sensors of the motor, a first signal from the first set of permanent magnets passing by the one or more sensors during rotation of the rotor;
  - obtaining, with one or more sensors of the motor, a second signal from the second set of permanent magnets passing by the one or more sensors during rotation of the rotor; and
  - analyzing the first and second signals and correlating to a position of the rotor,
  - wherein determining the absolute position of the rotor comprises analyzing only linear portions of signals from the one or more sensors.

12. The method of claim 11, wherein analyzing comprises applying a center of mass or centroid based interpolation.

* * * * *